United States Patent [19]

Williamson et al.

[11] Patent Number: 5,627,865
[45] Date of Patent: May 6, 1997

[54] TRIANGULAR LATTICE FOR LWR SQUARE FUEL ASSEMBLIES

[75] Inventors: Harold E. Williamson, Richland; Kenneth V. Walters, Kennewick, both of Wash.

[73] Assignee: Siemens Power Corporation, Richland, Wash.

[21] Appl. No.: 536,590

[22] Filed: Sep. 29, 1995

Related U.S. Application Data

[62] Division of Ser. No. 315,379, Sep. 30, 1994, Pat. No. 5,555,281.

[51] Int. Cl.$^6$ .................................................. G21C 3/32
[52] U.S. Cl. .................................. 376/434; 376/444
[58] Field of Search ............................ 376/434, 435, 376/438, 444

[56] References Cited

U.S. PATENT DOCUMENTS

| | | | |
|---|---|---|---|
| 4,522,781 | 6/1985 | Schluderberg | 376/434 |
| 4,585,614 | 4/1986 | Helmersson | 376/434 |
| 4,588,550 | 5/1986 | Blomstrand et al. | 376/434 |
| 4,717,533 | 1/1988 | Denizou | 376/438 |
| 5,299,244 | 3/1994 | Yamauchi et al. | 376/434 |

*Primary Examiner*—Daniel D. Wasil
*Attorney, Agent, or Firm*—Ira Lee Zebrak

[57] ABSTRACT

A nuclear fuel assembly for a boiling water reactor, comprising an outer channel having a substantially square cross-sectional area, and fuel rods arranged with a predetermined pitch in an array of 10×12 where the centers of the fuel rods are located at the vertices of equilateral triangles.

5 Claims, 15 Drawing Sheets

TRIANGULAR LATTICE FOR LWR SQUARE FUEL ASSEMBLIES

This application is a divisional of U.S. patent application Ser. No. 08/315,379, filed Sep. 30, 1994 for "TRIANGULAR LATTICE FOR LWR SQUARE FUEL ASSEMBLIES", now U.S. Pat. No. 5,555,281.

FIELD OF THE INVENTION

The present invention relates generally to nuclear fuel assemblies for nuclear reactors, and more particularly to fuel rod configurations for fuel assemblies that have a square cross-sectional area.

BACKGROUND OF THE INVENTION

Current operating light water reactors (LWR) utilize fuel assemblies that have a square cross-sectional area in which the nuclear fuel rods are located. Light water reactor designs employ a square array for the layout for control rod drives and consequently the area allocated for fuel assemblies is square. The fuel rods are distributed in the available square area so that there will be an approximately uniform distribution of coolant/moderator area for each fuel rod. The approach has been to arrange the fuel rods within the available square area so that there was an equal number of rows and columns of fuel rods with a uniform center-to-center distance (i.e. pitch) between fuel rods. This arrangement is referred to as a square lattice, as lines drawn through adjacent fuel rod centers divide the area into a number of uniform squares. The reactor power and power distribution (axial, radial and local peaking) set the volumetric power density generated in the fuel rods. The minimum spacing between fuel rods to assure adequate cooling of adjacent fuel rod surfaces, which has been determined by heat transfer tests, must be provided with allowance for manufacturing tolerances and predicted fuel rod bowing during operation. For a uniform array of fuel rods, the required minimum rod-to-rod spacing limits the maximum allowable fuel rod diameter for that array. Uniform distribution of uranium fuel and coolant moderator (i.e. water) has been typically obtained by selecting an equal number of rows and columns of fuel rods in a square lattice array and positioning the center of the nuclear fuel rods at the corners of the squares. Thus, the number of rows of fuel rods equal the number of fuel rods in a row. The fuel rod array is sized to obtain sufficient heat transfer area for the volume of nuclear fuel in a fuel rod to enable the removal of the heat generated by the fuel within temperature limits of the materials used for the fuel rod.

Boiling water reactor (BWR) fuel assemblies typically have such a fuel rod array in which the fuel rods are arranged in rows with the same number of fuel rods in each row as there are rows in the array. In adjacent rows, fuel rods are located with their centers at the corners of squares. Such square rod arrays or lattices are commonly named according to the number of rows of rods and number of rods in a row such as 8×8, 9×9, 10×10, etc. Regardless of the number of rows of rods, each array is constrained to fit within a standard size fuel assembly channel.

The use of a square lattice whereby fuel rods are located with their centers at the corners of squares results in a larger flow area at the center of the square formed by four fuel rods than is necessary. This is an inefficient use of the cross-sectional area within a fuel assembly channel. It is desirable to reduce the fuel rod linear heat generation rate and the internal fuel rod temperature for a given fuel assembly power level by increasing the number of fuel rods. This is done, for example, by changing from a 10×10 fuel rod array to an 11×11 array. Since the fuel rod array is constrained to fit within the fixed dimensions of a standard fuel assembly channel and is required to have a certain minimum fuel rod surface to surface and fuel rod surface to channel wall surface spacing, increasing the number of rows of fuel rods and number of fuel rods in a row necessitates a decrease in the fuel rod diameter. The fuel rod diameter must be reduced to maintain surface to surface spacing since the fuel rod center to center distance is reduced. The spacing between rods to allow for adequate cooling and to accommodate fuel rod bow cannot be reduced in proportion to the rod-to-rod pitch. As the quantity of the fuel rods is increased in a square lattice, the increased number of fuel rods will not compensate for the required fuel rod diameter reduction with the result that the uranium loading in the fuel assembly is reduced in the finely divided array.

For example, a 10×10 square lattice array would have a rod pitch of approximately 0.51 inch and a minimum rod surface to rod surface space that would allow for manufacturing tolerances, and rod bow to maintain adequate cooling throughout the operating life. If such a space were 0.114 inch, then the maximum rod diameter could be 0.396 inch. If the square lattice array was more finely divided to an 11×11, then the rod pitch would be approximately 0.464 inch. The maximum rod diameter would be limited to 0.35 inch to maintain the required 0.114 inch space between rods. The amount of space for fuel is proportional to the number of rods and their cross sectional area. The relative fuel cross sectional area for the two arrays would be $$\frac{11 \times 11 \times (0.35)^2}{10 \times 10 \times (0.396)^2} = 0.945$$

In BWR fuel assemblies, a number of fuel rod locations are reserved for use instead as water rods or a water channel to selectively increase neutron moderation for more efficient fuel utilization. If the square fuel rod array is more finely divided and if the number of reserved water rod locations remains constant, then the amount of moderating water within the water rods or water channel becomes smaller because of the smaller allowable diameter for both the fuel rods and water rods. If the number of reserved rod locations for water rods is increased as the array size is more finely divided, then the uranium loading for the fuel assembly is decreased even further. Thus, as the square fuel rod array is more finely divided and the number of water rods either increases or remains unchanged, inefficient fuel utilization as well as high fabrication costs result.

A triangular lattice array in which the centers of fuel rods are located at the vertices of a triangle is more desireable than the square lattice array in that it provides a more efficient arrangement of fuel rods while also maintaining required rod-to-rod spacing. For a specified fuel rod diameter and minimum rod-to-rod spacing, the triangular lattice allows a tighter packing of fuel rods within the given cross sectional area of the fuel assembly channel, resulting in a better allocation of area for flow of coolant water among fuel rods. The higher density of fuel rods will permit a higher loading of uranium, and better heat transfer characteristics as the coolant water is on the average in closer proximity to the fuel rod surfaces. In addition, more fuel rod heat transfer surface can be incorporated in a unit area than in a square lattice array of the same pitch, and greater flexibility for internal moderation using water rods and inner water channels can be obtained. Since the higher density of fuel rods permits a higher loading of uranium as the number of fuel rods in the assembly is increased, more fuel rod locations can be reserved for water rods or water channels without causing a decrease in the uranium loading in comparison to a square lattice array which will have fewer fuel rod positions.

A triangular lattice however cannot be made to fit into a square cross-sectional area by having an equal number of rows and columns of fuel rods.

It is an object of the invention to have a fuel rod arrangement in which a triangular lattice is utilized for fuel assemblies that are square.

SUMMARY OF THE INVENTION

In accordance with one aspect of the invention, a nuclear fuel assembly for boiling water reactors is provided having a plurality of elongated parallel fuel rods supported between a lower tie plate positioned toward the bottom of the assembly and an upper tie plate positioned toward the top of the assembly, an outer channel surrounding the plurality of fuel rods and having a substantially square cross-sectional area for conducting coolant/moderator about the fuel rods from the bottom of the assembly toward the top of assembly, at least one spacer for positioning and retaining the fuel rods in a predetermined configuration, and the fuel rods being arranged with a predetermined pitch in an array where the centers of the fuel rods are located at the vertices of isosceles triangles.

BRIEF DESCRIPTION OF THE DRAWINGS

FIG. 4b is a view of three adjacent fuel rods of the fuel assembly shown in FIG. 4a;

FIG. 8b is a view of three adjacent fuel rods of the fuel assembly shown in FIG. 8a;

FIG. 9b is a view of three adjacent fuel rods of the fuel assembly shown in FIG. 9a;

FIG. 11b is a view of three adjacent fuel rods of the fuel assembly shown in FIG. 11a;

FIG. 12b is a view of three adjacent fuel rods of the fuel assembly shown in FIG. 12a;

FIG. 13b is a view of three adjacent fuel rods of the assembly shown in FIG. 13a;

DETAILED DESCRIPTION OF THE INVENTION

The trend in reactor fuel design has been to increase the number of fuel rods in an assembly to more finely divide the uranium fuel so that the heat generated in the fuel may be more readily transferred to the coolant. This allows progressively more heat to be generated in an assembly but must be within limits on fuel rod power to assure reliable performance of the fuel rod. Increased power generated by a fuel assembly can (1) improve nuclear fuel utilization through greater freedom to optimize the core power distribution, (2) improve plant capacity factor by permitting more rapid power changes, or (3) increase the overall power density of the core and the plant power output.

In BWRs, fuel rod array designs have progressed from 7×7 through 8×8 and 9×9 to the 10×10. In PWRs, the early fuel rod array designs were 14×14 and 15×15 and later designs are 16×16 and 17×17.

To prevent degradation of the heat transfer efficiency, a minimum separation between fuel rods is required. To be assured of the required separation, an allowance must be made for both fabrication tolerances as well as irradiation induced bow of the fuel rods.

A square lattice BWR 10×10 fuel assembly has 100 fuel rod positions available and the rod-to-rod pitch will be approximately 0.51 inches. The required rod-to-rod spacing will determine the maximum allowable fuel rod diameter without degradation of heat transfer efficiency during the fuel assembly operation. This places a limit on the volume of fuel that can be incorporated in a given fuel assembly length. However, in accordance with the present invention, if the fuel rods are configured in a 10×12 triangular lattice array, then 120 fuel rod locations are made available with a larger rod diameter than in the 11×11 square lattice array, thus increasing the volume of fuel in a given fuel assembly length. In a square lattice array, the 120 potential fuel rod locations would require an 11×11 lattice. The 11×11 rod pitch would be about 0.464 inch and the maximum rod diameter would be reduced by the rod-to-rod spacing requirement so that the volume of fuel that could be incorporated in a given length of fuel assembly would be reduced to less than for the 10×12 array.

Figure 1:
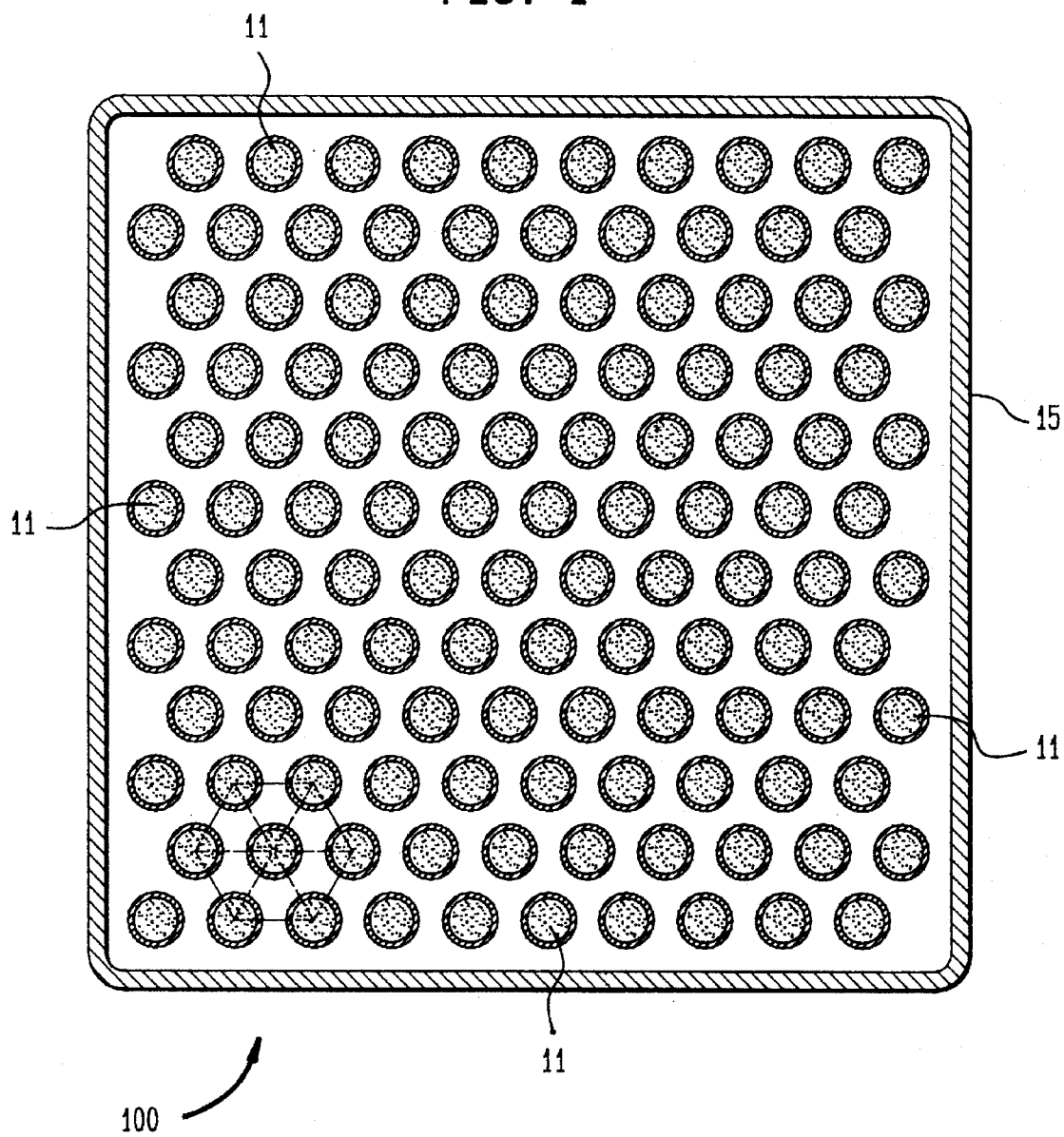
FIG. 1 is a horizontal cross sectional view of a BWR fuel assembly having a 10×12 fuel rod arrangement with a triangular lattice in accordance with the present invention.

Referring to FIG. 1, a boiling water reactor fuel assembly 100 has fuel rods 11 positioned within the area formed by outer channel 15. According to the prior art, a 10×10 array of fuel rods would be positioned within the area formed by the outer channel. Fuel rods 11 are arranged with their centers located at the vertices of equilateral triangles rather than the corners of squares. Six adjacent triangles having a common vertex form a hexagon. Fuel rods 11 are arranged in 12 rows with 10 rods in each row so as to fit within the confines of outer channel 15. The arrangement shown in FIG. 1 is a 10×12 hexagonal BWR fuel assembly and contains 120 fuel rod locations which is within one rod position available in a square lattice array of 11×11. The hexagonal arrangement shown in FIG. 1 has the advantage that a larger fuel rod diameter can be used while maintaining the same rod surface to rod surface spacing and rod surface to channel wall spacing of a square lattice array of about the same number of fuel rods, because of the more efficient utilization of cross sectional area within the outer channel. In a square lattice array, an 11×11 arrangement would be necessary to provide 120 fuel rod locations provided by the 10×12 hexagonal arrangement. Consequently, the 11×11 rod pitch would be reduced (about 0.464 inches) and a smaller fuel rod diameter (less than $^{10}/_{11}$) would be necessary to maintain the required rod surface to rod surface spacing for adequate cooling. The smaller diameter fuel rods would provide a lower amount of uranium fuel per rod. Referring to the earlier example, the 11×11 lattice could have a rod diameter of 0.35 inches, for a rod-surface-to-rod surface spacing of 0.114 inches. The 10×12 triangular lattice would have a rod pitch of 0.485 inches and could have a rod diameter of about 0.371 inches, providing an increase in relative fuel cross sectional area of approximately $$\frac{120 \times (.371)^2}{121 \times (.35)^2} = 1.11$$

Thus, the triangular lattice arrangement of FIG. 1 enables the use of larger fuel rod diameters that could be used in an 11×11 array. Because of the larger fuel rod diameter(s), more water rods and part length fuel rods can be used while maintaining the fuel assembly uranium content. Thus, increased diameter of fuel rods, permissible in a triangular lattice relative to a square lattice, allows a greater fraction of the fuel rod positions to be used for water channels, water rods, part length fuel rods, and/or part length fuel rods having part length water rods.

Figure 2:
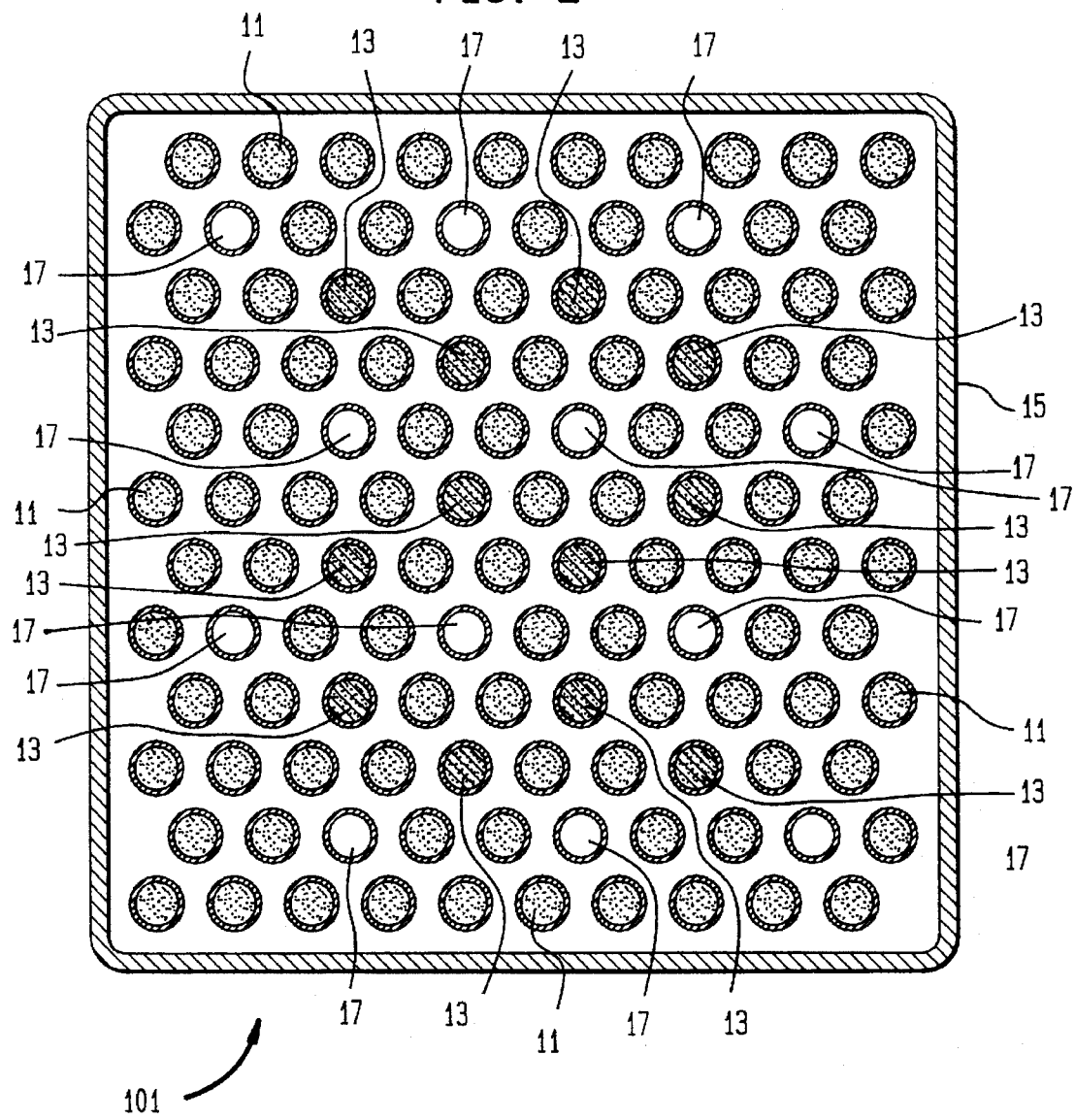
FIG. 2 is a horizontal cross sectional view of the BWR fuel assembly shown in FIG. 1 with selective fuel rods replaced by water rods or part length fuel rods.

Referring to FIG. 2, fuel rods 11, water rods 17 and part length fuel rods 13 are positioned in fuel assembly 10 so that every fuel rod 11 and part length fuel rod 13 is: (a) directly adjacent to either a water rod 17 or the outer channel 15; or (b) has a direct line of sight to a water rod or the outer channel. This configuration results in a greater probability that fast neutrons born by fission in the fuel rods will escape resonance capture in another fuel rod and instead be thermalized in the water rods or in the water outside of the fuel channel. The higher probability of neutron thermalization produces a larger thermal neutron source throughout the fuel assembly with resultant increased fuel utilization. This arrangement could not be achieved in a square lattice fuel assembly having a similar number of possible rod locations without severely reducing the uranium content of the fuel assembly. Satisfactory uranium loading can be maintained in the triangular lattice because of the larger number of fuel rod locations and the inherently larger possible uranium loading.

Figure 3:
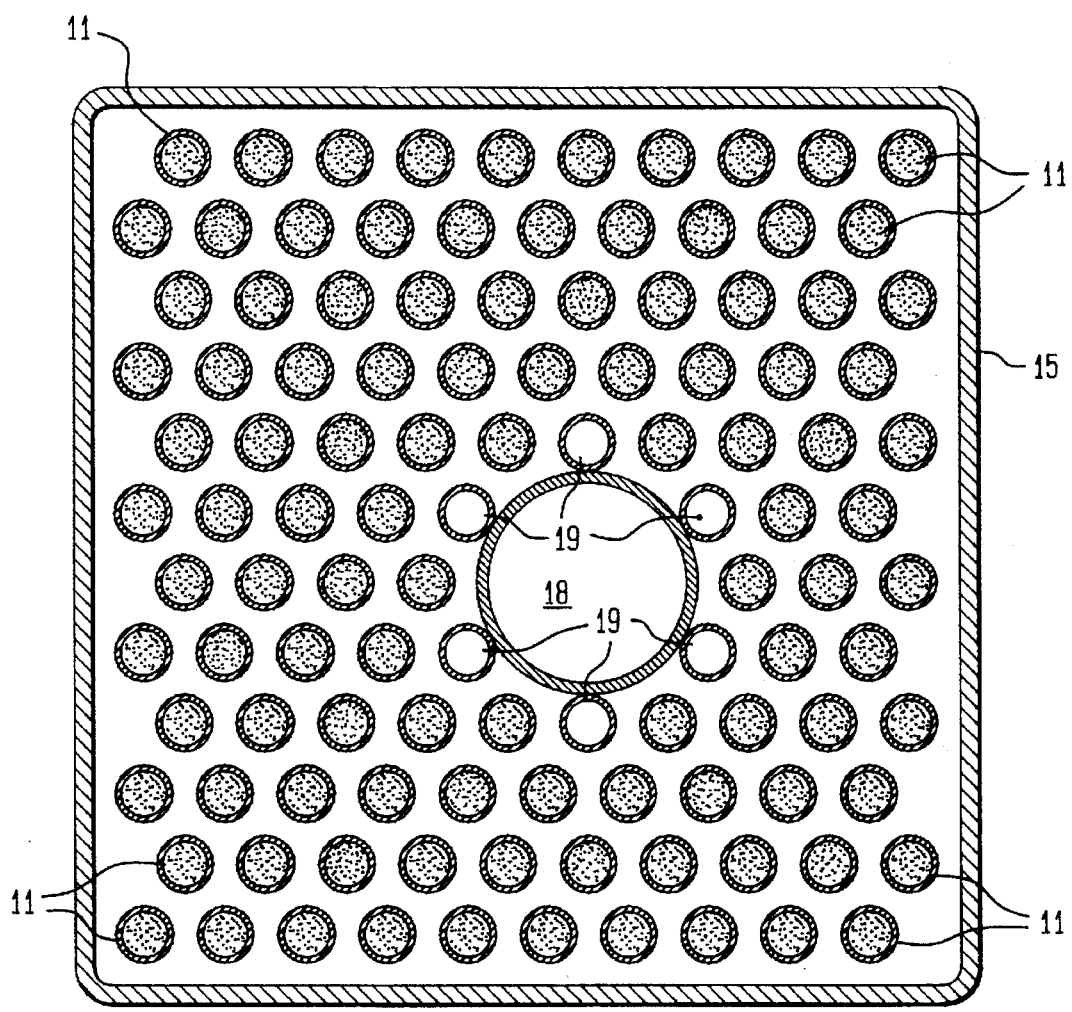
FIG. 3 is a horizontal cross-sectional view of a BWR fuel assembly having a 10×12 fuel rod arrangement with a triangular lattice and a centrally located water channel in place of seven centrally located fuel rods.

In most cases, some fuel rod positions will be occupied by water rods or water channels to add moderation and obtain better uranium utilization. The 10×12 triangular lattice array shown in FIG. 1 makes about 6 more fuel rod positions available for water rods or channels while maintaining an equal volume for uranium fuel as a 10×10 square lattice array. BWR fuel assemblies are typically under-moderated at their centers. Accordingly, supplemental water moderation is most effective when placed near the center of the assembly cross-section. Referring to FIG. 3, a center water channel composed of (a) a tube 18 (having a diameter up to two rod pitches and a fuel rod diameter) and (b) six smaller tubes 19 (each having the diameter of a fuel rod) is substituted for thirteen fuel rod positions near the assembly center. Center water channel assembly comprising tubes 18 and 19 fits into the triangular array so as not to disrupt the uniformity of coolant area distribution.

Figure 13A:
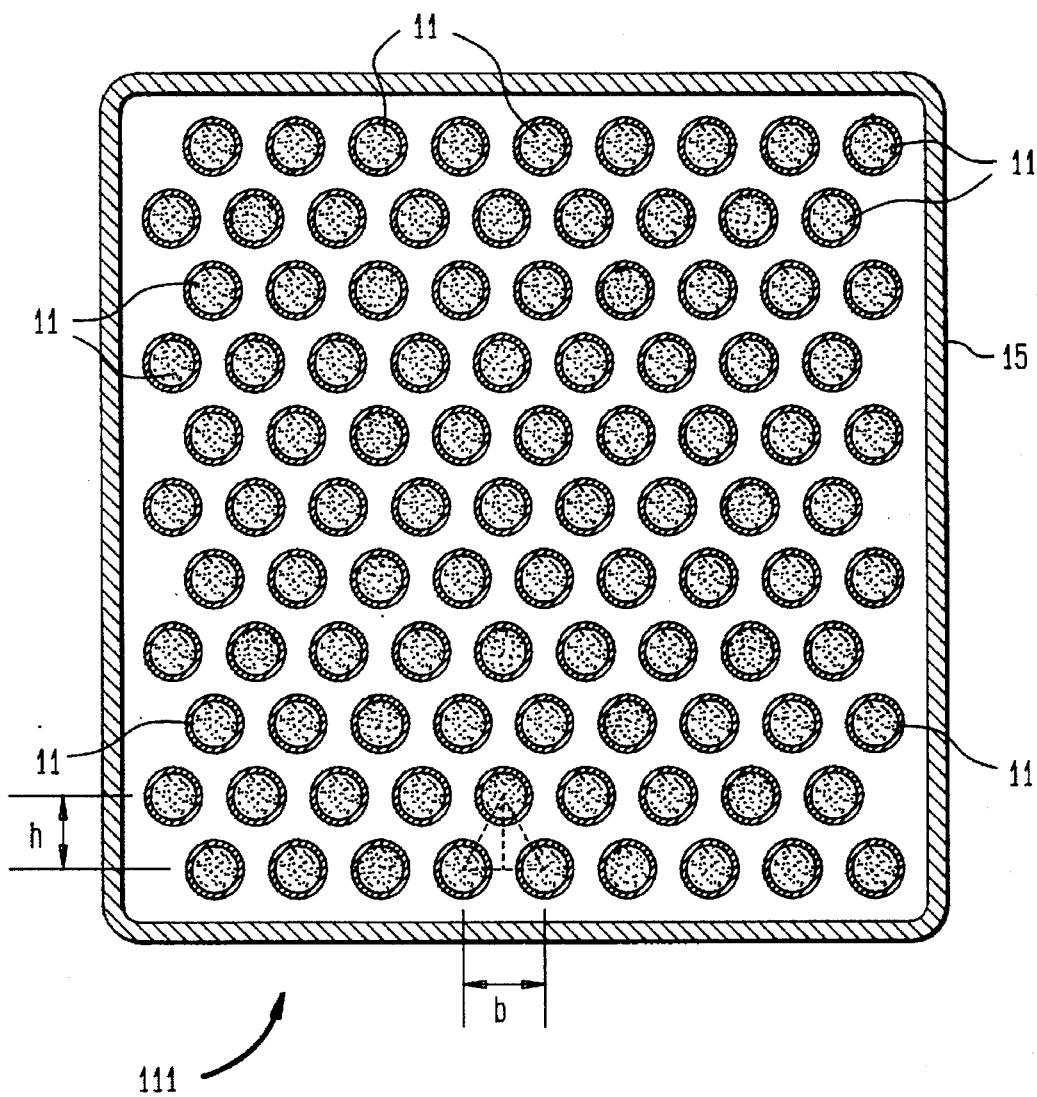
FIG. 13a is a horizontal cross-sectional view of a BWR fuel assembly having a 9×11 fuel rod arrangement with a triangular lattice.
Figure 13B:
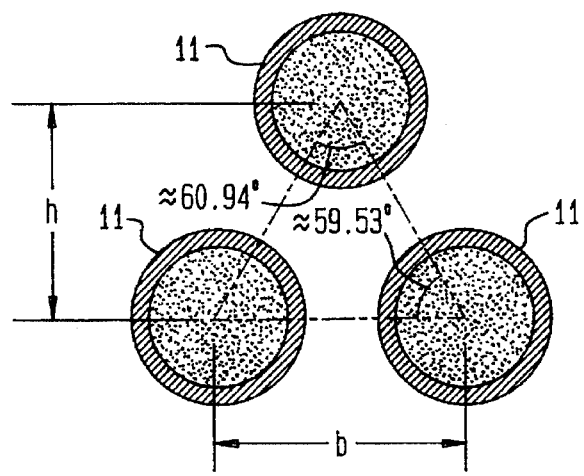

Although an equilateral triangular lattice has the advantage of the most dense and uniform packing of fuel rods, a very limited number of equilateral triangular lattices fit into an approximately square boundary. One of these the 10×12 hexagonal BWR Fuel Assembly is shown in FIGS. 1–3 and is discussed above. In accordance with another embodiment of the present invention, other triangular lattice arrays could be made by slightly modifying the triangular lattice from equilateral to fit into a square boundary with approximately uniform distribution of coolant area to each fuel rod. One of these non-equilateral triangular arrays, a 9×11 array is shown in FIG. 13a. In this embodiment of the invention, a triangular fuel rod lattice for a square fuel assembly is obtained by placing the centers of the fuel rods at the vertices of isosceles triangles. Referring to FIG. 13a, BWR fuel assembly 111 having a 9×11 fuel rod arrangement within outer channel 15 is shown with the centers of fuel rods 11 located at the vertices of isosceles triangles with a height h to base b ratio (h/b) of about 0.85. The angles at the base, of the isosceles triangle are approximately 59.53 degrees and the angle opposite the base, the apex, is approximately 60.94 degrees as shown in FIG. 13b. If the required rod surface to rod surface spacing is 0.114 inch as in the square lattice array is to be maintained, then the maximum fuel rod diameter in the 9×11 is limited to about 0.415 inch. This is determined by the sides of the triangle opposite the base angles because they are, in this arrangement, shorter than the base of the triangle. The dimension b for a typical BWR fuel assembly which has an inside channel dimension of about 5.278 inches and a rod to channel wall spacing of 0.145 inch is 0.537 inch. The sides of the triangles opposite the base angles will be 0.986×0.537 inch =0.529 inch. This dimension of 0.529 inch less the rod-to-rod space of 0.114 inch leaves 0.415 inch for the rod diameter. This is larger than the rod diameter of a 10×10 square lattice array which was 0.396 inch and provides $$\frac{99}{100} \times \left( \frac{0.415}{0.396} \right)^2 = 1.087 \text{ as much available area for nuclear fuel material.}$$

In addition, orthogonal symmetry which is symmetry across each centerline perpendicular to the assembly faces so that the assembly can be divided into identical quarters can be obtained for lattices with an odd number of fuel rod rows by removing one fuel rod from every other row.

Figure 4A:
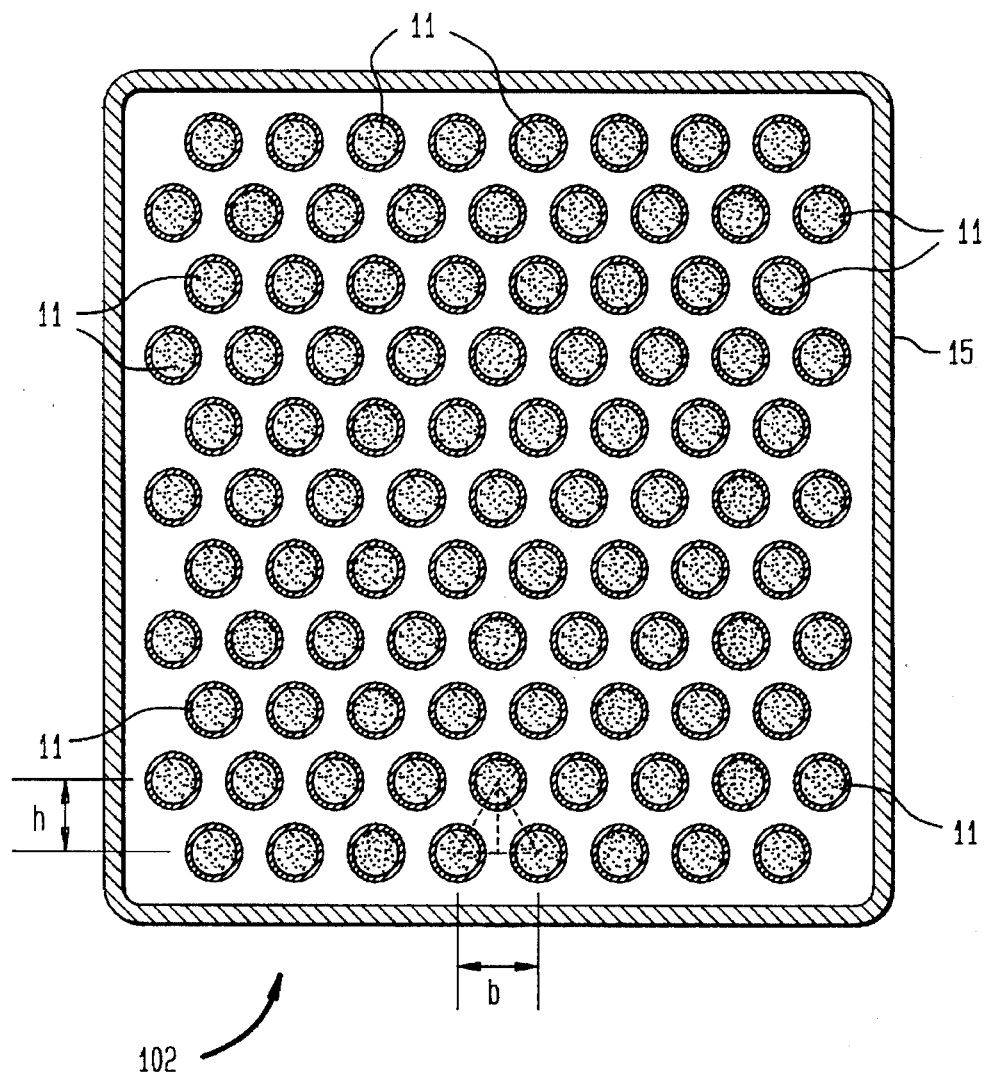
FIG. 4a is a horizontal cross-sectional view of a BWR fuel assembly having a 8:9×11 fuel rod arrangement with a triangular lattice.

Another non-equilateral triangular array, a 8:9×11 array is shown in FIG. 4a. In this embodiment of the invention, a triangular fuel rod lattice for a square fuel assembly is also obtained by placing the centers of the fuel rods at the vertices of isosceles triangles. The designation 8:9×11 identifies that this array has a number of fuel rods that alternates from row to row from 8 to 9 to 8 etc. Thus, the array in FIG. 4a begins with 8 fuel rods in the bottom row, and alternates in the next row to 9 fuel rods, and again alternates back to 8 fuel rods for all 11 rows. The ratio of the height to the base of the isosceles triangle of the triangular lattice is selected to create a high density triangular arrangement of fuel rods. In a specific application, a fuel rod diameter less than the maximum allowable based on minimum rod-to-rod spacing requirements may be selected to reduce flow resistance or optimize the water-to-fuel ratio for reactivity characteristics.

Figure 4B:
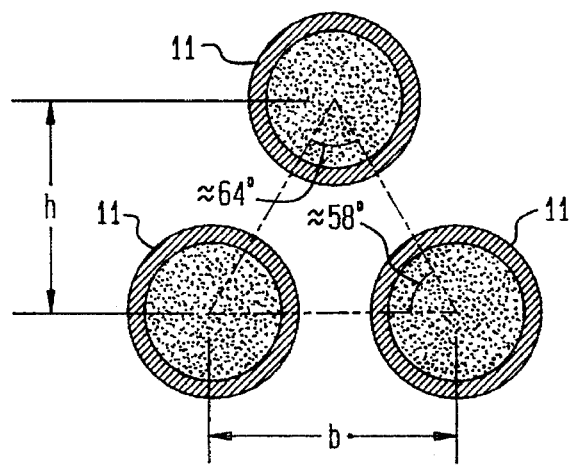
Figure 5:
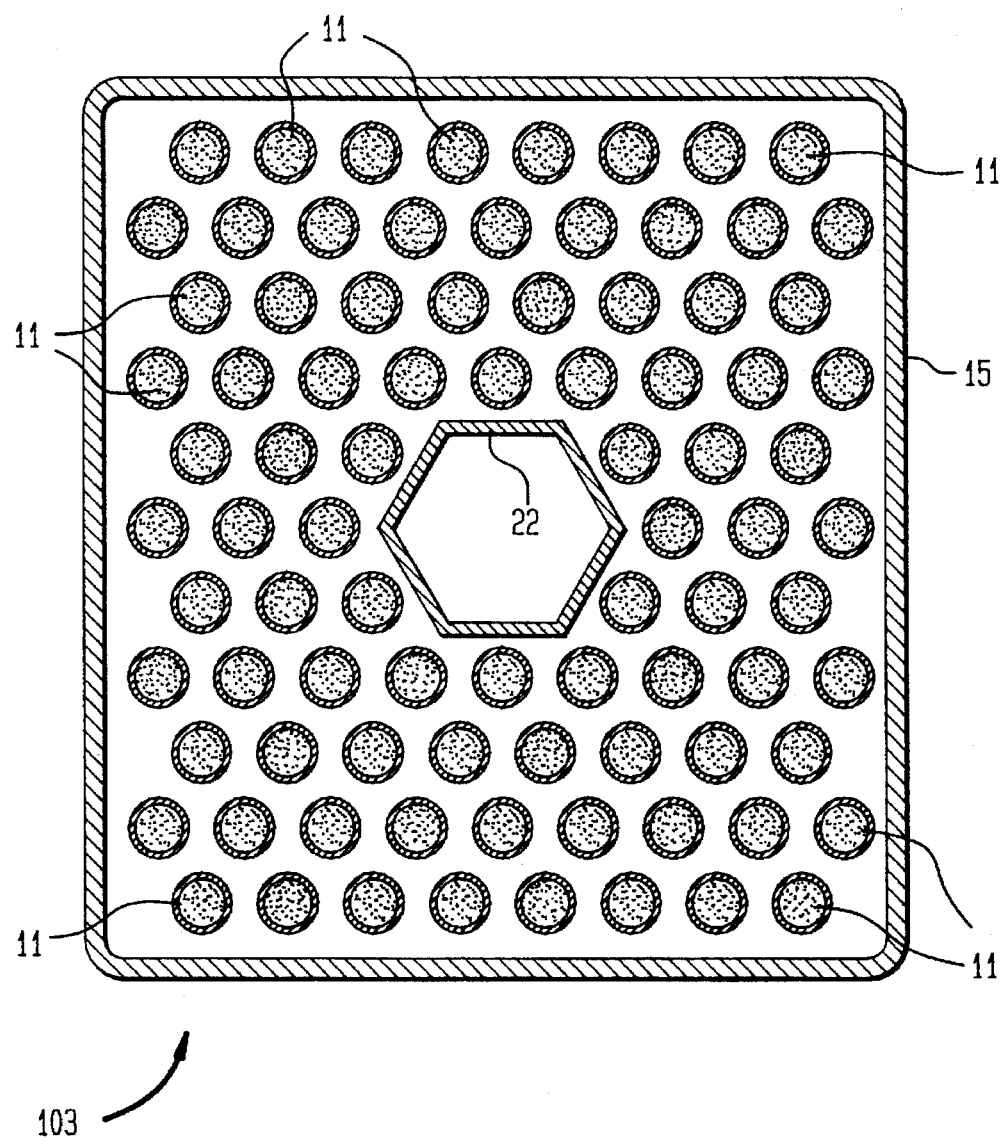
FIG. 5 is a horizontal cross-sectional view of a BWR fuel assembly having a 8:9×11 fuel rod arrangement with a triangular lattice and a centrally located water channel in place of seven centrally located fuel rods.

In a preferred embodiment, the isosceles triangles should be as near equilateral as possible to maximize the packing density of the fuel rods with a nearly uniform rod-to-rod spacing. Referring to FIG. 4a, BWR fuel assembly 102 having a 8:9×11 fuel rod arrangement is shown with the centers of fuel rods 11 located at the vertices of isosceles triangles with a height h to base b ratio (h/b) of 8 to 10, or 0.8. The angles at the base of the isosceles triangle are approximately 58 degrees, and the apex angle is approximately 64 degrees as shown in FIG. 4b. This arrangement is symmetrical across any centerline, so that all four corners present the same geometry to the channel walls, and the assembly may be divided into identical quarters for convenience in reactivity and power distribution calculations. Referring to FIG. 5, this symmetry across any centerline facilitates the substitution of a centrally located hexagonal water channel 22 for the seven centrally located fuel rods providing water moderation of neutrons in the center of the fuel assembly in order to flatten the thermal neutron flux. Further, the absence of fuel rods in the corners of fuel assembly 103 shown in FIG. 5 will reduce corner fuel rod power peaking and will permit larger radii for the outer channel corners making the channel easier to fabricate with thick corners. It is a further advantage that the absence of fuel rods in the corner of assembly 103 shown in FIG. 5 will permit reduction of the rod surface to channel wall surface spacing to that provided for rod surface to rod surface spacing thereby allowing an increase in the rod pitch and consequently the rod diameter.

Figure 6:
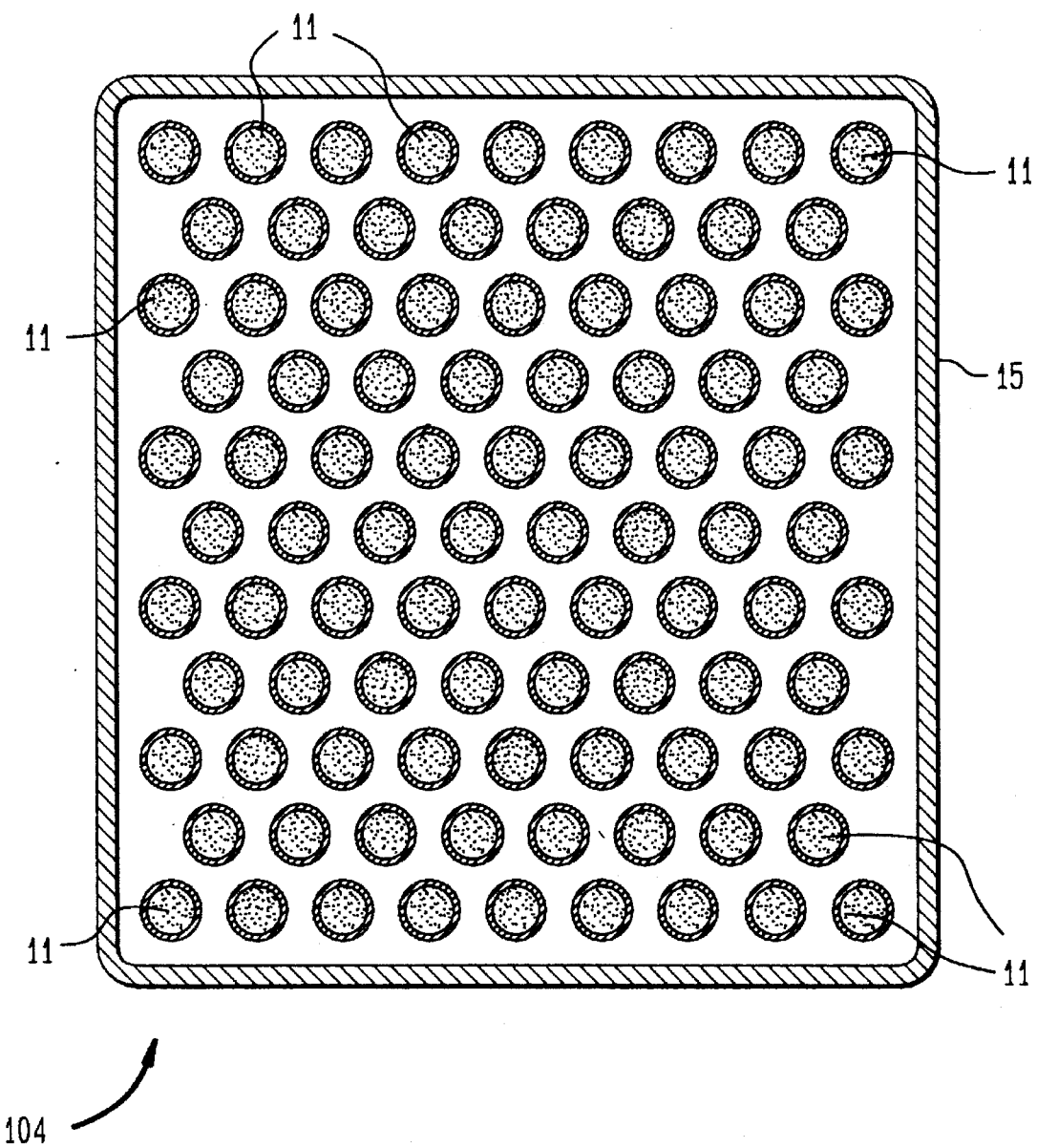
FIG. 6 is a horizontal cross-sectional view of another BWR fuel assembly having a 9:8×11 fuel rod arrangement with a triangular lattice.

In an alternative embodiment shown in FIG. 6, a BWR fuel assembly 104 having a 9:8×11 fuel rod arrangement (i.e. eleven rows with the number of fuel rods per row alternating from 9 to 8 to 9 etc.) with the centers of fuel rods 11 at the vertices of isosceles triangles similar to FIGS. 4a and 5, but further includes fuel rods positioned in the four corners of the assembly. Fuel assembly 104 further differs from fuel assembly 103 shown in FIG. 4a in that the fuel rod loading is increased by one fuel rod to increase the amount of uranium in the fuel assembly when fuel loading takes priority over corner rod power peaking. In order to alter the moderation of the assemblies shown in FIGS. 4–6, water rods, water channels and/or part length fuel rods can be positioned in place of the fuel rod(s) in either a symmetrical or asymmetrical pattern.

Figure 7:
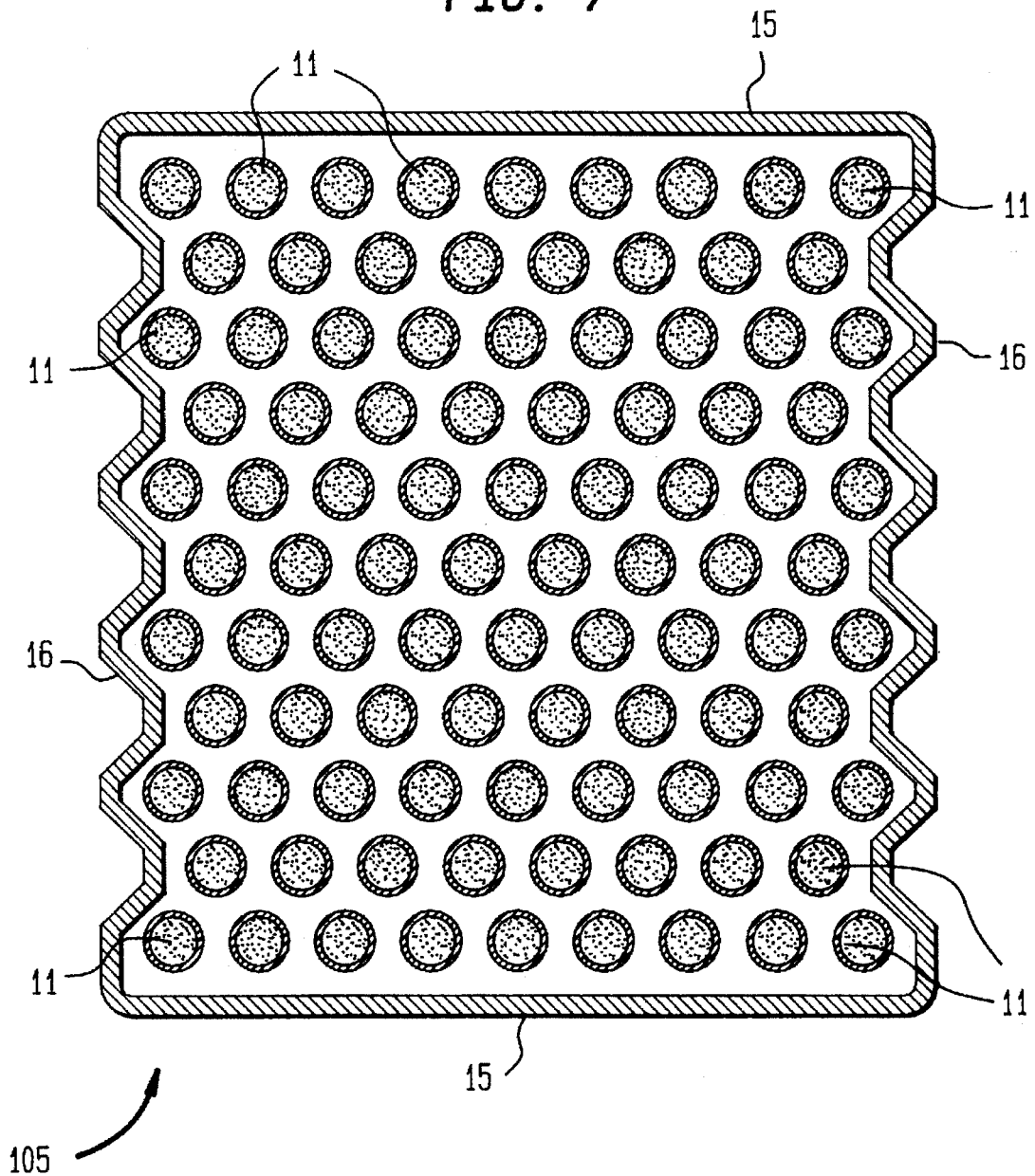
FIG. 7 is a cross-sectional view of the BWR fuel assembly of FIG. 6 but with corrugated walls replacing the straight outer channel walls.

In each of the assemblies shown in FIGS. 4–6 and 13, outer channel 15 is shown having straight walls. Referring to FIG. 7, the indentation of every other row of fuel rods 11 allows two of the outer channel walls 16 of the fuel assembly 105 to be corrugated on two sides giving it greater rigidity to resist seismic forces, and improves the uniformity of distribution of the coolant flow area.

As stated above, nuclear fuel rods are spaced apart from one another to provide adequate flow area for coolant to remove heat from each of the fuel rods. In addition, it is highly desirable to have a method of verifying that the minimum required space between fuel rods has been provided. In a square lattice array, rod-to-rod spacing is readily verified by passing a calibrated shim through the line-of-sight between the rows and columns of fuel rods. A difficulty with a triangular lattice is that the line-of-sight between a column of fuel rods is blocked by the rods in the next row. This difficulty is overcome by recognizing, in accordance with the present invention, that a line-of-sight may be maintained parallel to the line of fuel rod centers by judicious choice of height to base ratios of the isosceles triangular lattice or pitches and rod diameters of interest. The resulting three line-of-sight directions can then be used to verify the adequacy of rod-to-rod spacing.

Figure 14:
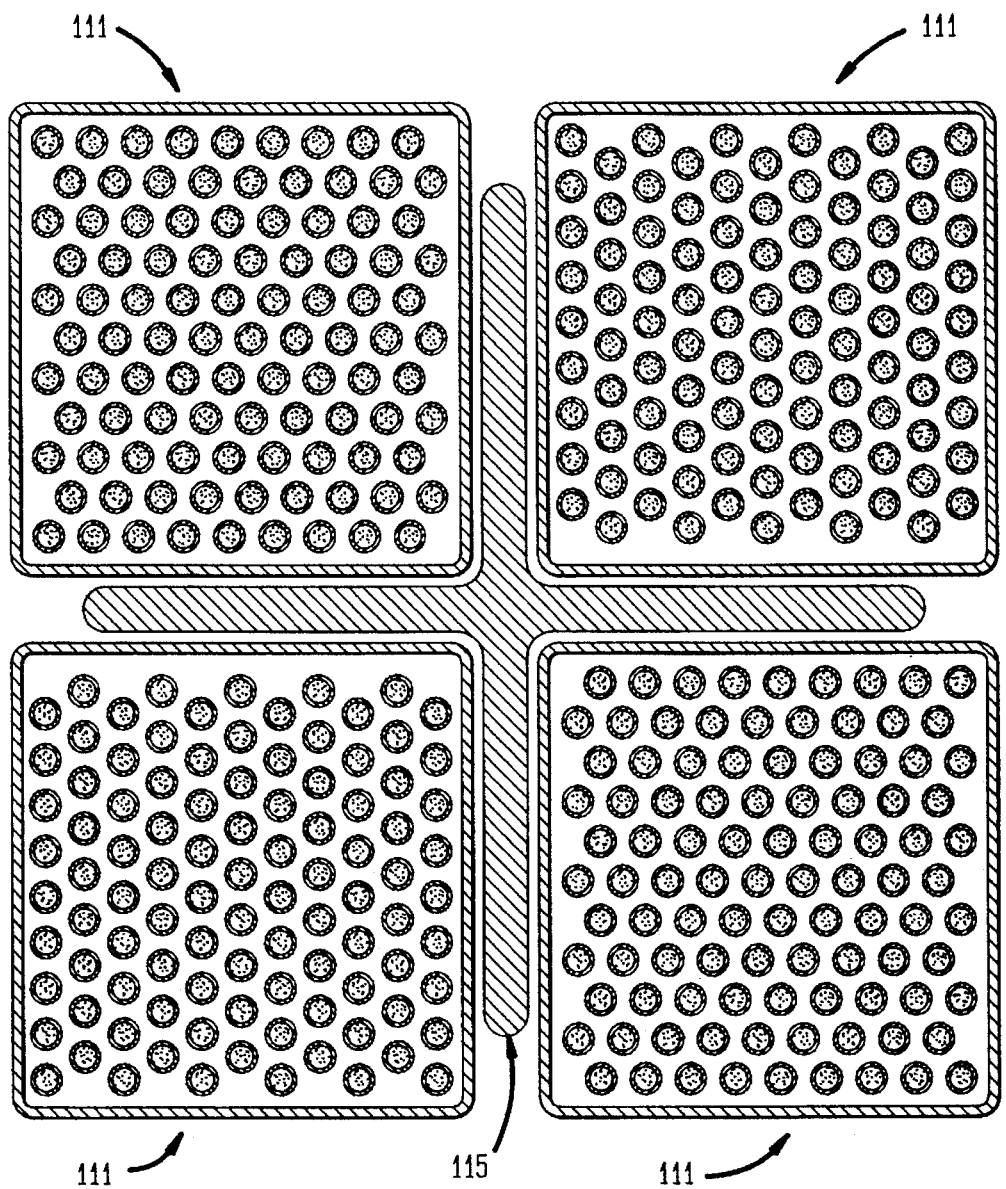
FIG. 14 is a cross-sectional view of a BWR control blade surrounded by four BWR fuel assemblies in accordance with the present invention.
Figure 15:
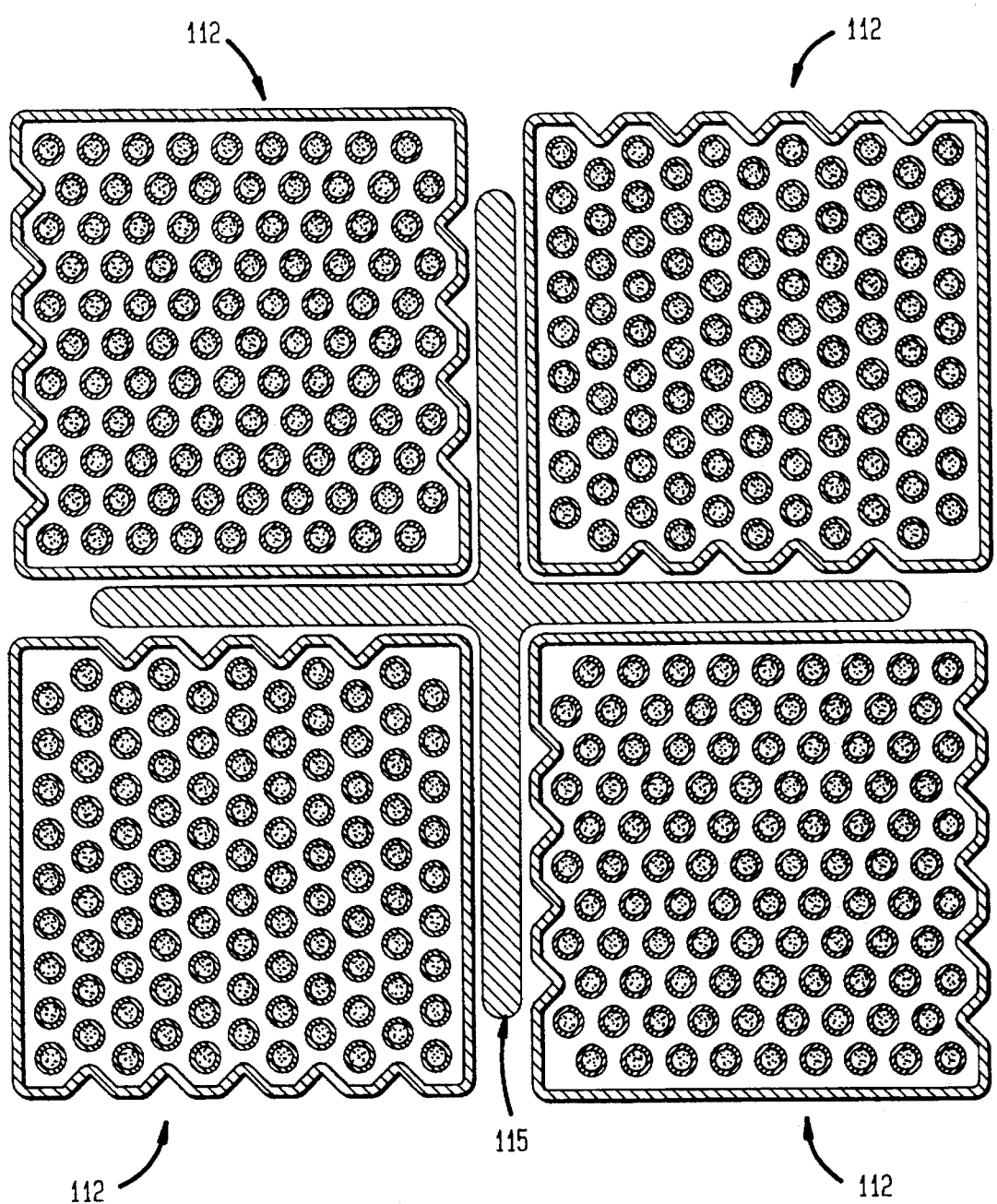
FIG. 15 is a cross-sectional view of a BWR control blade surrounded by four BWR fuel assemblies each having two corrugated walls.

A BWR core is composed of repetitions of control rod modules each of which comprises a control rod blade surrounded by four fuel assemblies. The preferred loading of triangular lattice BWR assemblies (for example four fuel assemblies 111 in accordance with the present invention) will put the assembly faces with uniform rod to channel spaces adjacent to assembly faces that have alternating rod to channel spaces as shown in FIG. 14 so that the water gap area between channels will be substantially uniform. This arrangement will also present uniform corner patterns without rods at the assembly corners located at the juncture of the control rod blades 115 as shown in FIG. 14. Not only will this arrangement provide a substantially uniform distribution of water moderator around the assemblies, but the core will be stiffened against seismic forces in each direction by corrugating the channel faces of fuel assemblies 112 as shown for example in FIG. 15.

Figure 8A:
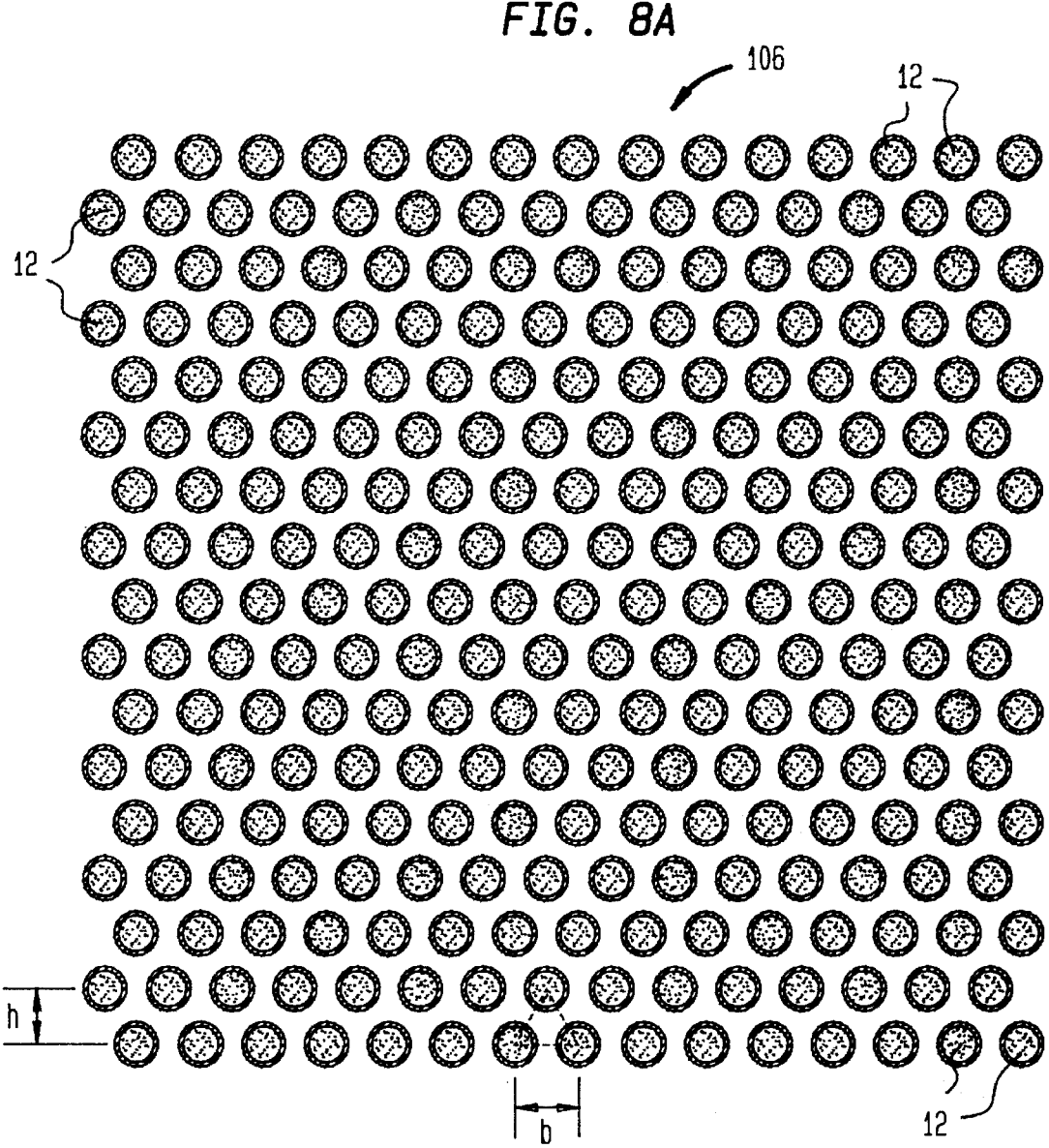
FIG. 8a is a cross-sectional view of a PWR fuel assembly having a 15×17 fuel rod arrangement with a triangular lattice.
Figure 8B:
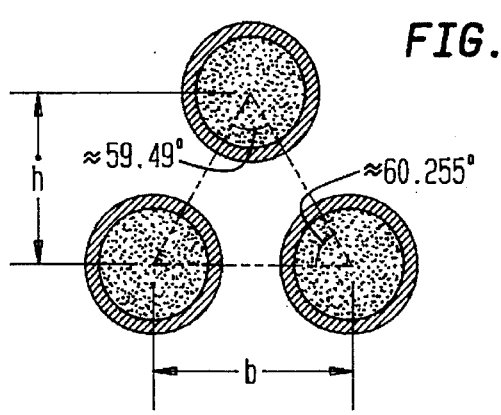
Figure 11A:
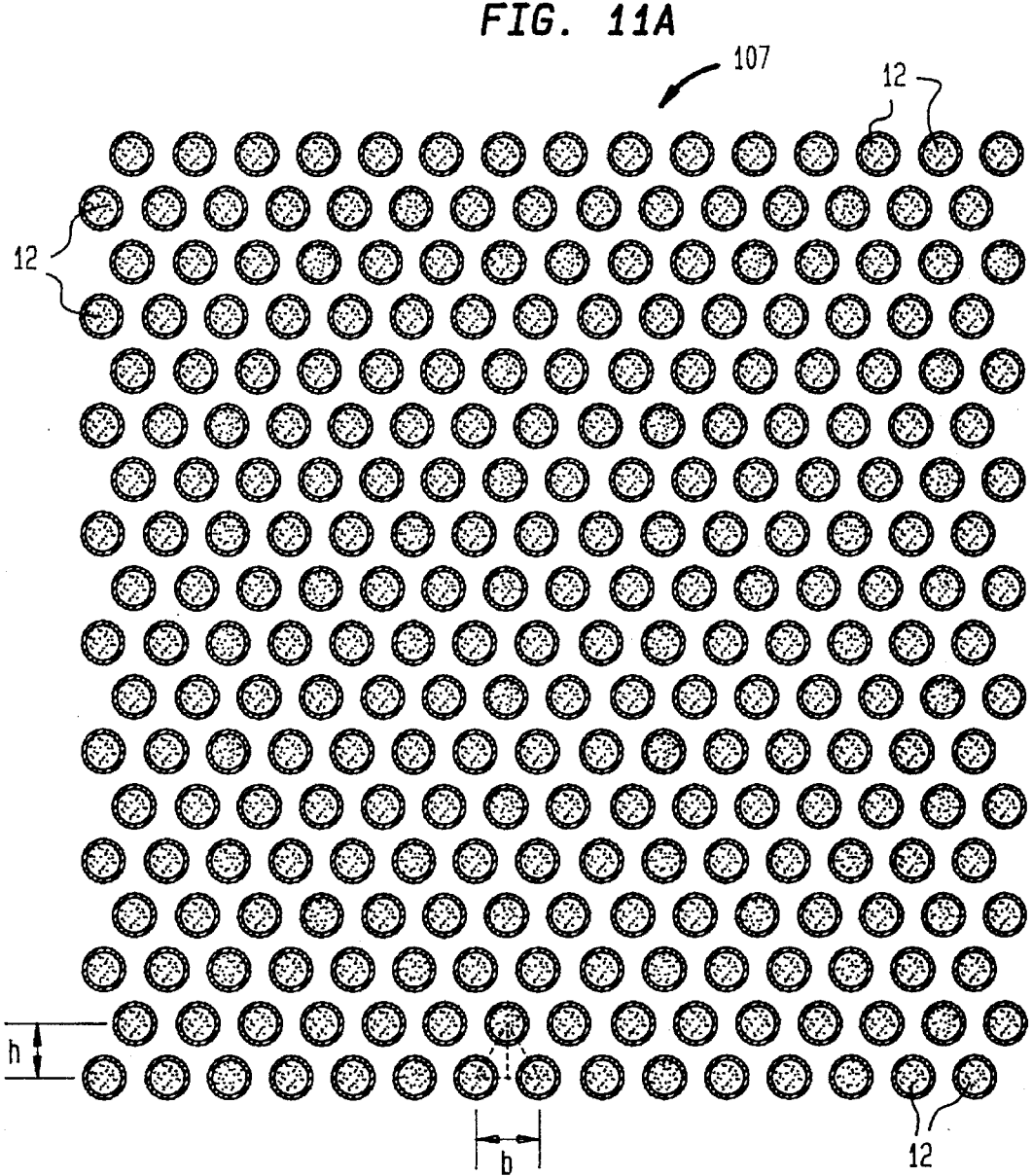
FIG. 11a is a cross-sectional view of a PWR fuel assembly having a 15×18 fuel rod arrangement with a triangular lattice.
Figure 11B:
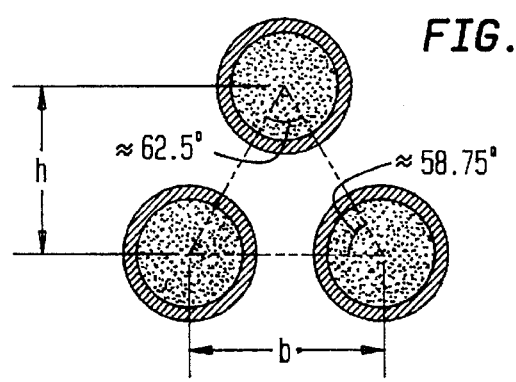

As contrasted to BWR fuel assemblies, fuel assemblies for pressurized water reactors (PWRs) have larger cross-sectional areas and have more fuel rods. Typical present day PWR fuel assemblies include 15×15 and 17×17 fuel rod arrays distributed on a square lattice. In accordance with another embodiment of the present invention, an isosceles triangular fuel rod lattice with a height h to base b ratio h/b of about 0.875, with base angles only slightly greater than 60 degrees (i.e. approximately 60.255) would be used to distribute fuel rods 12 in PWR fuel assembly 106 to form a 15×17 array as shown in FIGS. 8a and 8b. In another embodiment, an isosceles triangular fuel rod lattice with a height h to base b ratio h/b of about 0.824, with base angles only slightly less than 60 degrees (i.e. approximately 58.75) would be used to distribute fuel rods 12 in PWR fuel assembly 107 to form a 15×18 array as shown in FIGS. 11a and 11b. Fuel assemblies 106 and 107 each has the same overall cross-sectional area of the fuel assemblies of the prior art having a 15×15 array distributed on a square lattice. Slight modification of the PWR control rod cluster assemblies might be necessary since control rod guide tubes typically take fuel rod positions within the lattice. Thus, control rod guide tubes will be selectively positioned within the fuel rod arrays shown in FIGS. 8a and 8b as well as those discussed below in accordance with reactivity control requirements.

Figure 9A:
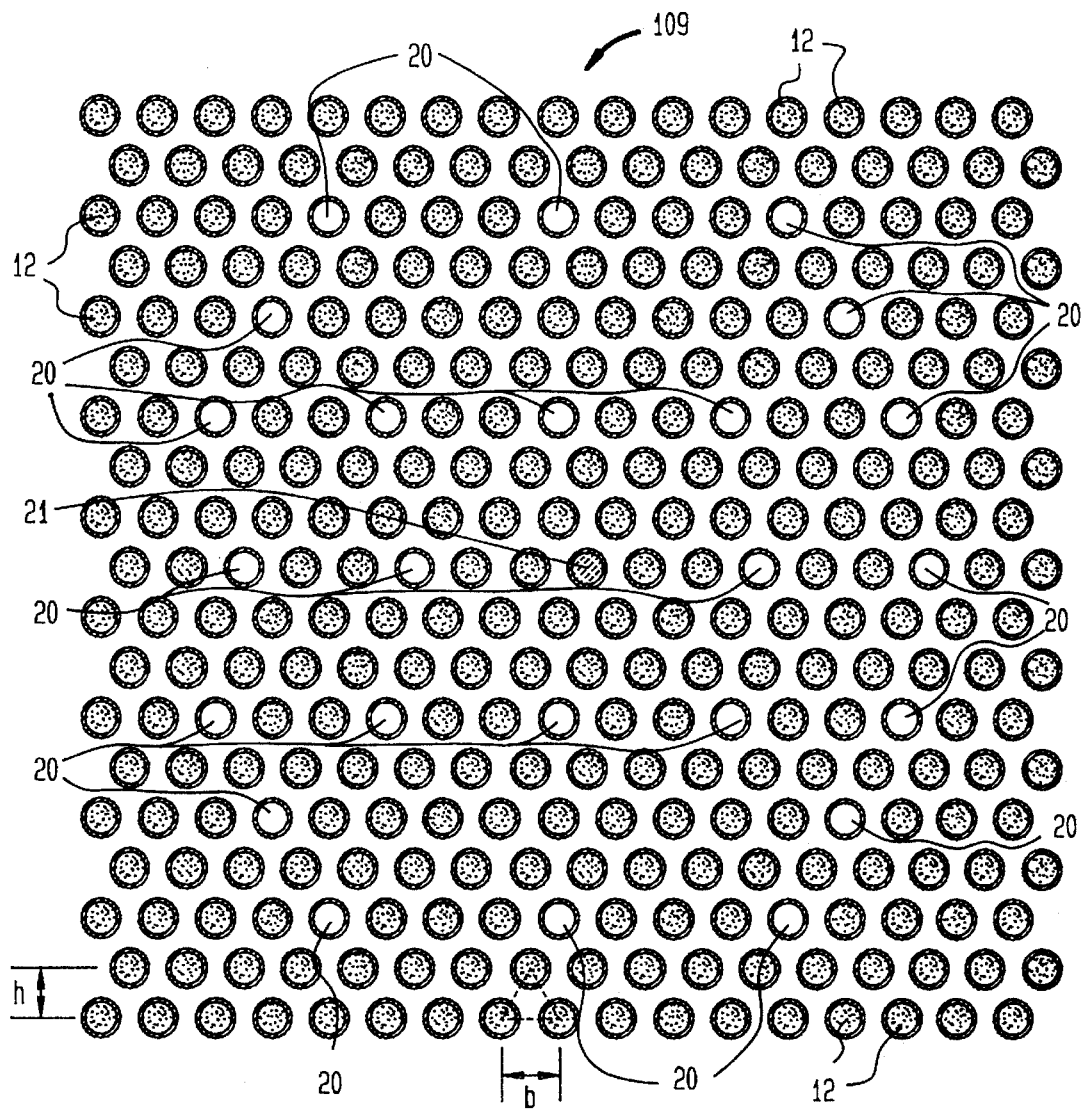
FIG. 9a is a cross-sectional view of a PWR fuel assembly having a 17×19 fuel rod arrangement with a triangular lattice.
Figure 9B:
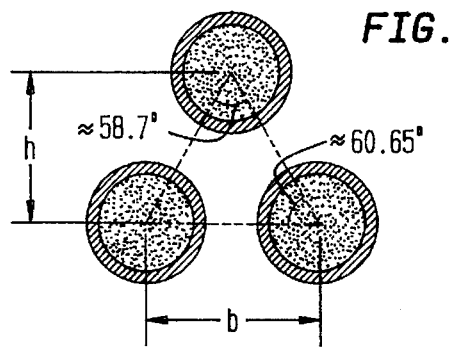
Figure 12A:
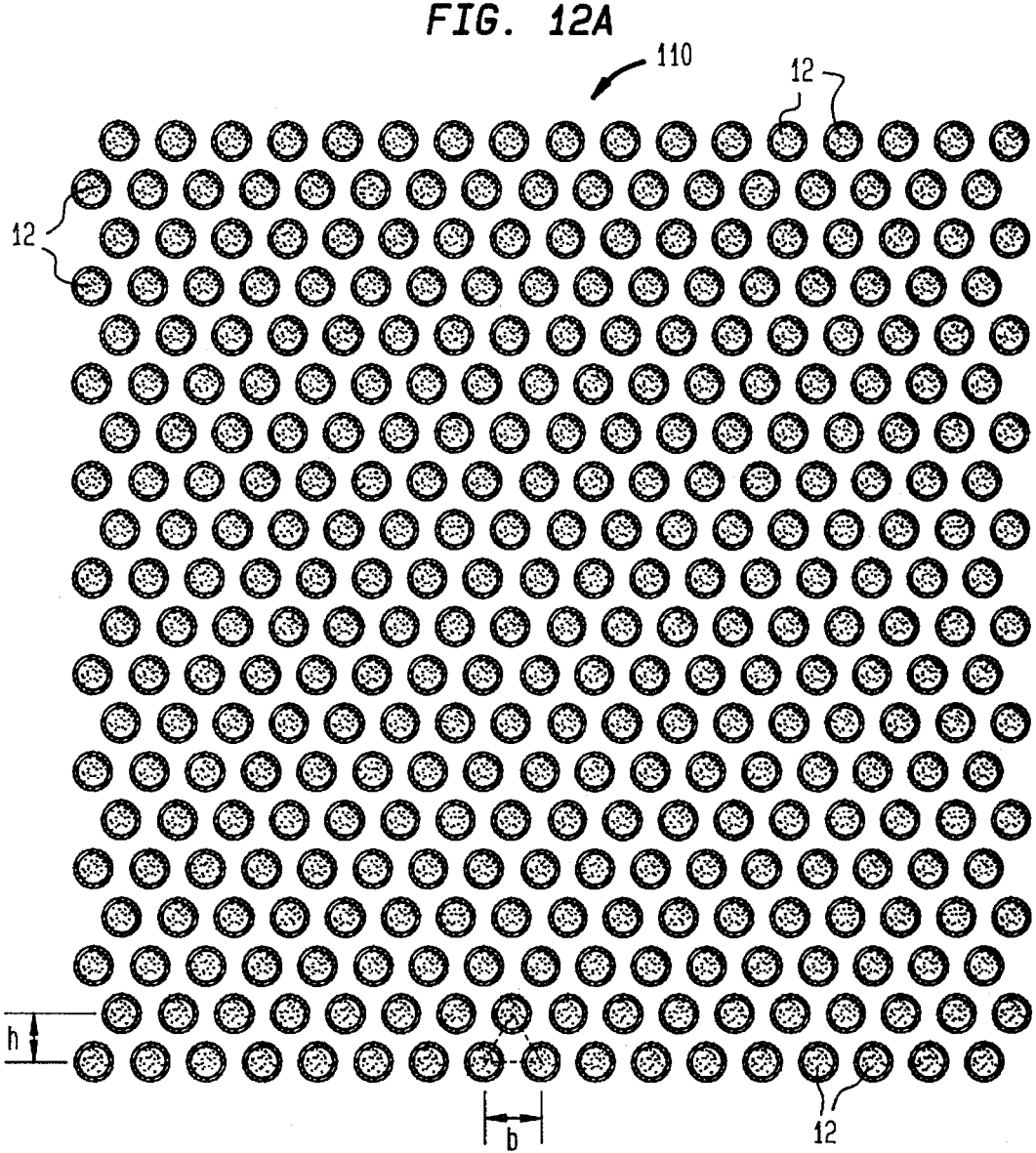
FIG. 12a is a cross-sectional view of a PWR fuel assembly having a 17×20 fuel rod arrangement with a triangular lattice.
Figure 12B:
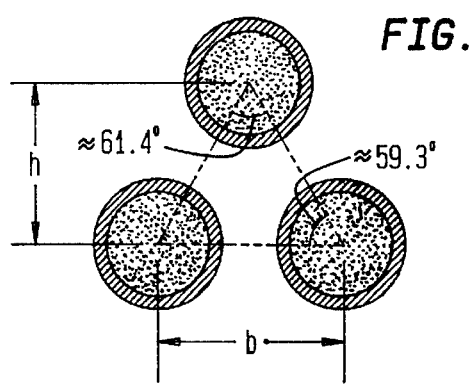

Referring to FIGS. 9a and 9b, a 17×19 PWR fuel assembly array 109 of triangular lattice fuel rods 12 with a height h to base b ratio h/b of about 0.889 and base angles of approximately 60.65 degrees can be used as an alternative to the prior art fuel assemblies having a 17×17 square lattice array. FIG. 9a shows a typical position of guide tubes 20 in fuel assembly 109, but can be located in alternative positions within the array. Instrumentation tube 21 is typically located in the very center of the array. A 17×20 PWR fuel assembly array 110 of triangular lattice fuel rods 12 with a height h to base b ratio h/b of about 0.842 and base angles approximately 59.3° shown in FIGS. 12a and 12b can be similarly used as an alternative to the prior art PWR fuel assemblies having a 17×17 square lattice array. Fuel assemblies 109 and 110 each has the same overall cross-sectional area of the fuel assemblies of the prior art having a 17×17 array distributed on a square lattice.

Figure 10:
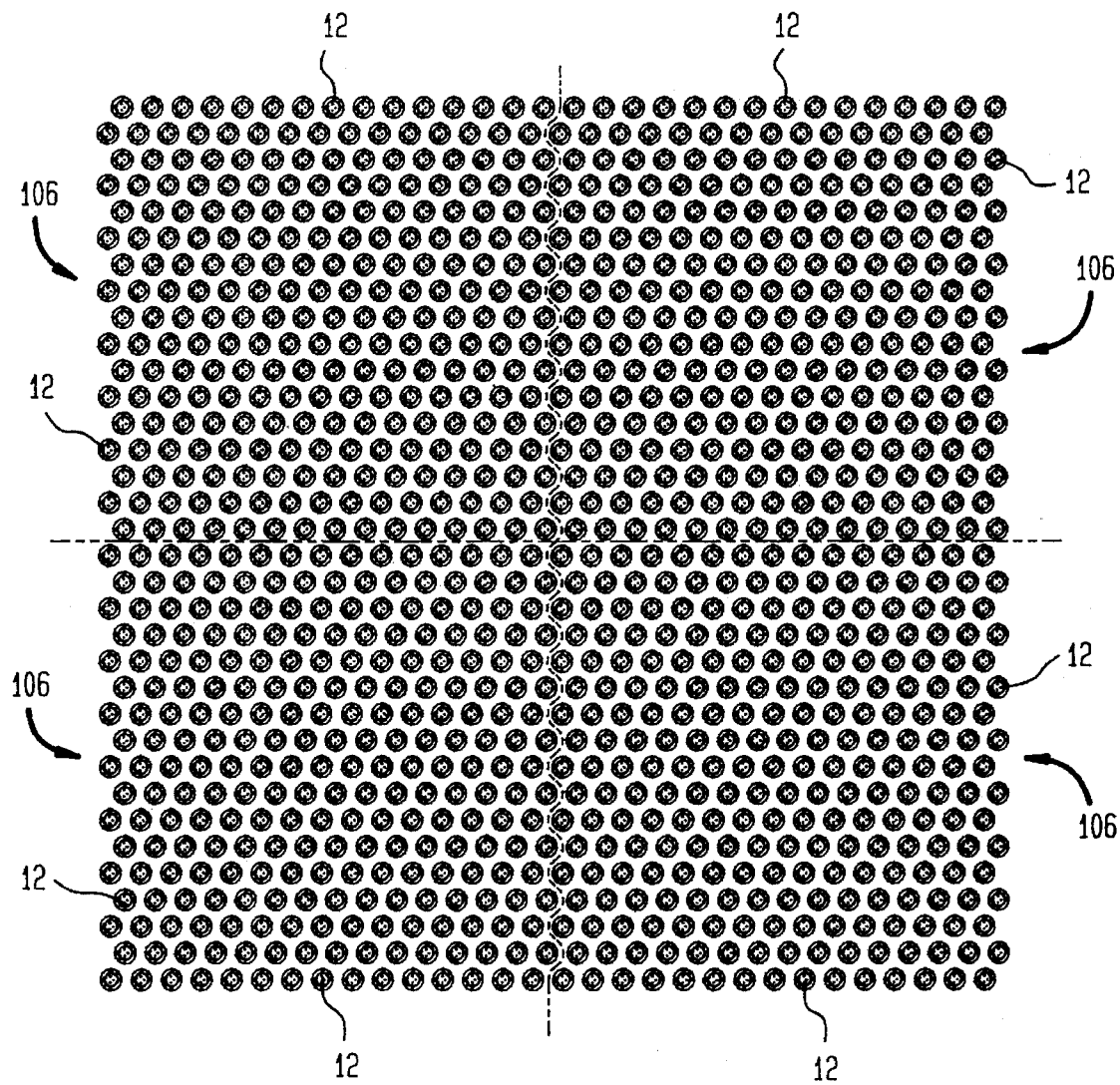
FIG. 10 is a cross-sectional view of four PWR fuel assemblies each having a triangular lattice fuel rod arrangement showing how they interface together.

Since PWR fuel assemblies do not include an outer channel as in BWR fuel assemblies, each fuel assembly (e.g. FIGS. 8 or 9) can interfit with one another at their boundaries as shown for example in FIG. 10. Four fuel assemblies 106 interface together (shown as dashed lines) to form a regular distribution of fuel rods without any discontinuities.

While the present invention has been particularly shown and described with reference to preferred embodiments thereof, it will be understood by those skilled in the art that various changes in form and details may be made therein without departing from the spirit and scope of the invention.

We claim:

1. A nuclear fuel assembly for boiling water reactors, the assembly having a plurality of elongated parallel fuel rods supported between a lower tie plate positioned toward the bottom of the assembly and an upper tie plate positioned toward the top of the assembly;

an outer channel surrounding the plurality of fuel rods and having a substantially square cross-sectional area for conducting coolant/moderator about the fuel rods from the bottom of the assembly toward the top of assembly;

at least one spacer for positioning and retaining the fuel rods in a predetermined configuration;

the fuel rods being arranged with a predetermined pitch in an array of 10×12 where the centers of the fuel rods are located at the vertices of equilateral triangles.

2. A nuclear fuel assembly for boiling water reactors, the assembly having: a plurality of elongated parallel full length fuel rods supported between a lower tie plate positioned toward the bottom of the assembly and an upper tie plate positioned toward the top of the assembly;

a plurality of spaced apart part length fuel rods supported at their lowermost ends to the lower tie plate, and extending upwards therefrom into an upper portion of the fuel assembly, a plurality of water rods for conducting coolant/moderator therethrough from the bottom of the assembly toward the top of the assembly;

at least one spacer for positioning and retaining fuel rods;

an outer channel surrounding the plurality of full length fuel rods and part length fuel rods and having a substantially square cross-sectional area for conducting coolant/moderator about the full length fuel rods and part length fuel rods from the bottom of the assembly toward the top of assembly;

the full length fuel rods, part length fuel rods and water rods being arranged with a predetermined pitch in an array of 10×12 where the centers of the full length fuel rods, the part length fuel rods, and the water rods are located at the vertices of equilateral triangles.

3. A nuclear fuel assembly for boiling water reactors, the assembly having a plurality of elongated parallel fuel rods supported between a lower tie plate positioned toward the bottom of the assembly and an upper tie plate positioned toward the top of the assembly;

an outer channel surrounding the plurality of fuel rods and having a substantially square cross-sectional area for conducting coolant/moderator about the fuel rods from the bottom of the assembly toward the top of assembly;

a center water channel disposed toward the center of the cross-sectional area of the assembly and having at least one wall for conducting coolant/moderator therethrough from the bottom of the assembly toward the top of the assembly;

a plurality of water rods for conducting coolant moderator therethrough from the bottom of the assembly toward the top of the assembly;

at least one spacer for positioning and retaining the fuel rods in a predetermined configuration;

the fuel rods, water rods, and center water channel being arranged with a predetermined pitch in an array of 10×12 where the centers of the fuel rods are located at the vertices of equilateral triangles.

4. The fuel assembly as in claim 3 wherein the center water channel comprises a tube having a diameter greater than the diameter of the fuel rod and each one of the plurality of water rods has a diameter substantially the same as the diameter of the fuel rod.

5. The assembly as in claim 4 wherein the tube which comprises the center water channel has a diameter comprising of two rod pitches and a fuel rod diameter.

* * * * *